United States Patent
Inoue

(10) Patent No.: US 11,429,370 B2
(45) Date of Patent: Aug. 30, 2022

(54) SOFTWARE UPDATING APPARATUS, VEHICLE, AND SOFTWARE UPDATING METHOD

(71) Applicant: HONDA MOTOR CO., LTD., Tokyo (JP)

(72) Inventor: Genta Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 251 days.

(21) Appl. No.: 16/797,313

(22) Filed: Feb. 21, 2020

(65) Prior Publication Data
US 2020/0272451 A1 Aug. 27, 2020

(30) Foreign Application Priority Data
Feb. 22, 2019 (JP) .............. JP2019-030043

(51) Int. Cl.
| | | |
|---|---|---|
| *G06F 8/61* | (2018.01) | |
| *G06F 8/656* | (2018.01) | |
| *G06F 8/65* | (2018.01) | |
| *G06F 9/445* | (2018.01) | |
| *G06F 9/455* | (2018.01) | |
| *B60W 50/04* | (2006.01) | |

(52) U.S. Cl.
CPC .............. *G06F 8/65* (2013.01); *B60W 50/045* (2013.01); *B60W 2510/242* (2013.01)

(58) Field of Classification Search
CPC .......... G06F 8/65; Y02D 10/00; H04L 67/12; H04L 67/34; Y02T 10/70; B60W 50/045; B60W 2510/242
See application file for complete search history.

(56) References Cited

U.S. PATENT DOCUMENTS

| | | | |
|---|---|---|---|
| 8,645,736 B1 * | 2/2014 | Tabone | G06F 1/3209 |
| | | | 713/323 |
| 9,126,542 B2 | 9/2015 | Matsuura et al. | |
| 11,288,156 B2 * | 3/2022 | Ogawa | H02J 7/0029 |

(Continued)

FOREIGN PATENT DOCUMENTS

| | | |
|---|---|---|
| JP | 2006-235992 A | 9/2006 |
| JP | 2008-155892 A | 7/2008 |

(Continued)

OTHER PUBLICATIONS

Khorsravinia et al., Integrated OBD-II and mobile application for electric vehicle (EV) monitoring system, 5 pages (Year: 2017).*

(Continued)

*Primary Examiner* — Thuy Dao
(74) *Attorney, Agent, or Firm* — Carrier Blackman & Associates, P.C.; Joseph P. Carrier; Jeffrey T. Gedeon

(57) ABSTRACT

A software updating apparatus includes a power consumption amount determining section that determines a power consumption amount when a software update is performed, based on a power consumption of a vehicle when the software update is performed and time needed to perform the software update, and an update possibility determining section that determines whether the software update is possible, based on the power consumption amount determined by the power consumption amount determining section and an amount of power present in a battery included in the vehicle.

22 Claims, 10 Drawing Sheets

(56) References Cited

U.S. PATENT DOCUMENTS

| | | | |
|---|---|---|---|
| 2007/0022328 A1* | 1/2007 | Tarra | G06F 11/1433 714/100 |
| 2014/0351803 A1* | 11/2014 | Hoffman | G06F 11/1464 717/168 |
| 2017/0370737 A1* | 12/2017 | Zerod | H04W 4/027 |
| 2018/0018160 A1 | 1/2018 | Teraoka et al. | |
| 2018/0074811 A1 | 3/2018 | Kiyama et al. | |
| 2019/0250902 A1 | 8/2019 | Tateishi | |
| 2019/0361696 A1 | 11/2019 | Nakano | |
| 2020/0174779 A1* | 6/2020 | David | H04L 67/12 |
| 2020/0183674 A1 | 6/2020 | Tateishi et al. | |
| 2020/0225930 A1 | 7/2020 | Teraoka et al. | |

FOREIGN PATENT DOCUMENTS

| | | |
|---|---|---|
| JP | 2016-060407 A | 4/2016 |
| JP | 6147791 B2 | 6/2017 |
| JP | 6147792 B2 | 6/2017 |
| JP | 6216730 B2 | 10/2017 |
| JP | 2018020718 A | 2/2018 |
| JP | 2018-037022 A | 3/2018 |
| JP | 2018-045515 A | 3/2018 |
| JP | 2018-060310 A | 4/2018 |
| JP | 2018-063659 A | 4/2018 |
| JP | 2018-133721 A | 8/2018 |
| WO | 2012/017719 A1 | 2/2012 |
| WO | 2018/142750 A1 | 8/2018 |

OTHER PUBLICATIONS

Office Action dated May 25, 2021 issued over the corresponding Japanese Patent Application No. 2019-030043 with the English translation thereof.

Office Action dated Nov. 4, 2020 issued over the corresponding Japanese Patent Application No. 2019-030043 with the English translation thereof.

* cited by examiner

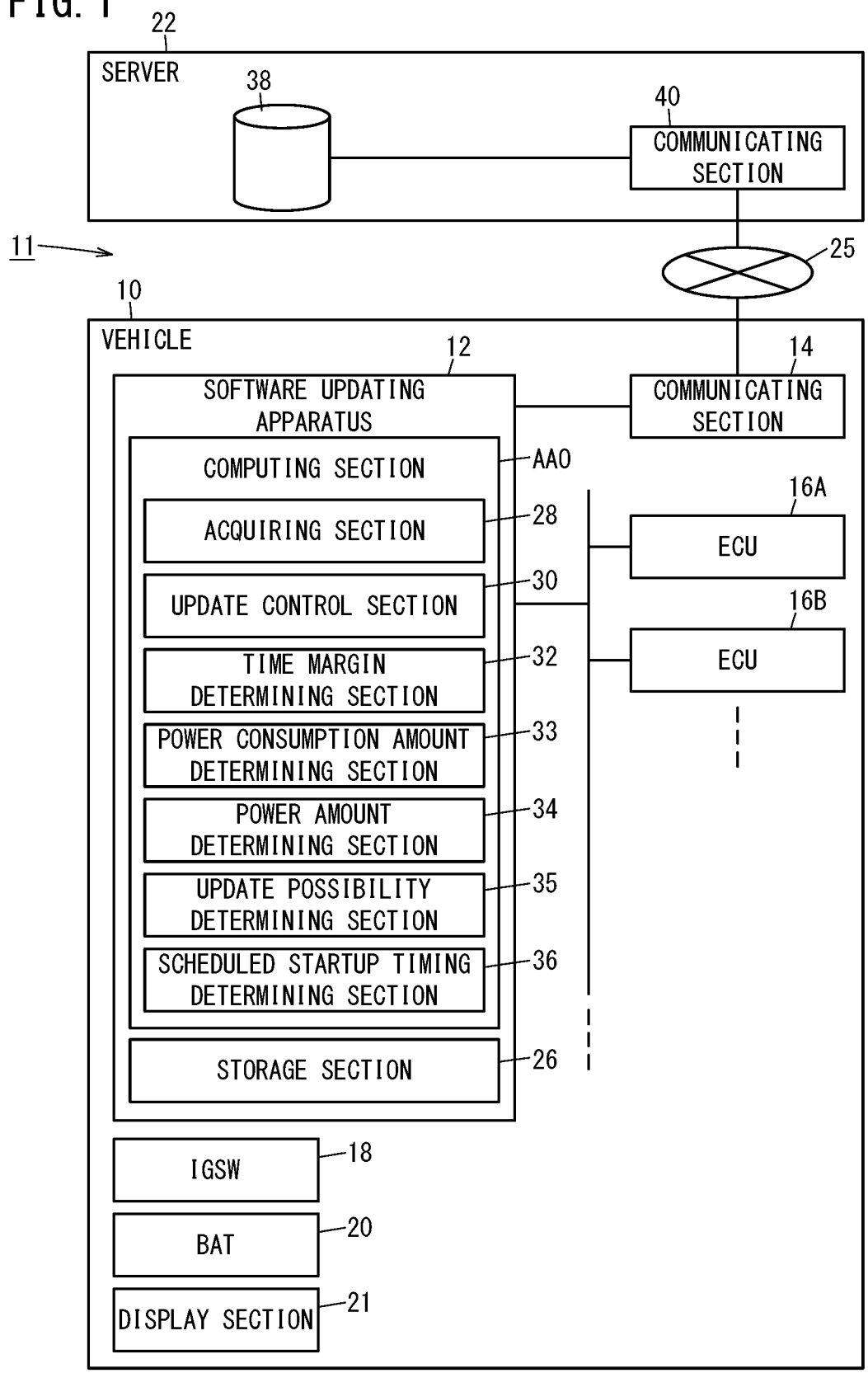

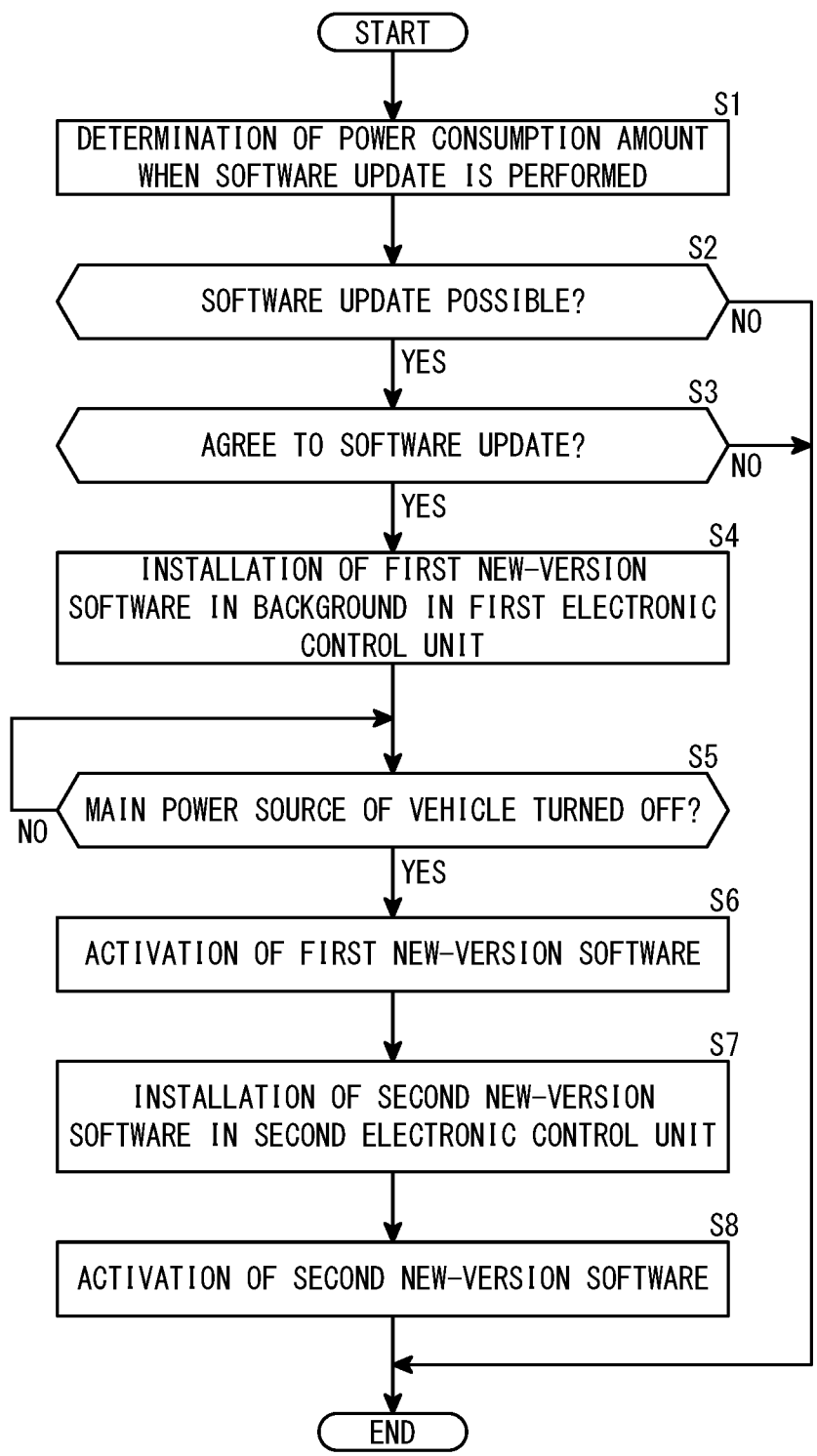

SOFTWARE UPDATING APPARATUS, VEHICLE, AND SOFTWARE UPDATING METHOD

BACKGROUND OF THE INVENTION

Field of the Invention

The present invention relates to a software updating apparatus, a vehicle, and a software updating method.

Description of the Related Art

Japanese Laid-Open Patent Publication No. 2018-045515 discloses technology for updating software of a control apparatus using update software distributed from a server.

SUMMARY OF THE INVENTION

However, there is a desire for technology capable of more favorably performing the update of the software.

It is an objective of the present invention to provide a software updating apparatus, a vehicle, and a software updating method that are capable of more favorably performing the update of the software.

A software updating apparatus according to an aspect of the present invention comprises an acquiring section configured to acquire new-version software supplied via a network; an update control section configured to perform a software update for an electronic control unit mounted in a vehicle, using the new-version software acquired by the acquiring section; a power consumption amount determining section configured to determine a power consumption amount when the software update is performed for the electronic control unit, based on a power consumption of the vehicle when the software update is performed and time needed to perform the software update for the electronic control unit; and an update possibility determining section configured to determine whether the software update for the electronic control unit is possible, based on the power consumption amount determined by the power consumption amount determining section and an amount of power present in a battery included in the vehicle, wherein, if the update possibility determining section determines that the software update for the electronic control unit is possible, the update control section performs the software update for the electronic control unit.

A software updating apparatus according to another aspect of the present invention comprises an acquiring section configured to acquire new-version software supplied via a network; an update control section configured to perform a software update for an electronic control unit mounted in a vehicle, using the new-version software acquired by the acquiring section; a power consumption amount determining section configured to determine a power consumption amount when the software update is performed for the electronic control unit, based on a power consumption of the vehicle when the software update is performed and time needed to perform the software update for the electronic control unit; and an update possibility determining section configured to determine whether the software update for the electronic control unit is possible, based on the power consumption amount determined by the power consumption amount determining section and an amount of power present in a battery included in the vehicle, wherein if a value obtained by subtracting the power consumption amount determined by the power consumption amount determining section from the amount of power present in the battery is greater than or equal to a threshold value, the update possibility determining section determines that the software update for the electronic control unit is possible, and if the update possibility determining section determines that the software update for the electronic control unit is possible, the update control section performs the software update for the electronic control unit.

A vehicle according to yet another aspect of the present invention comprises the software updating apparatus such as described above.

A software updating method according to still another aspect of the present invention is a software updating method for performing a software update for an electronic control unit included in a vehicle, by using new-version software supplied via a network, the software updating method comprising a step of determining a power consumption amount when the software update is performed for the electronic control unit, based on a power consumption of the vehicle when the software update is performed and time needed to perform the software update for the electronic control unit; and a step of determining whether the software update for the electronic control unit is possible, based on the power consumption amount determined in the step of determining the power consumption amount and an amount of power present in a battery included in the vehicle.

According to the present invention, it is possible to provide a software updating apparatus, a vehicle, and a software updating method that are capable of more favorably performing the update of the software.

The above objective, features, and benefits can be easily understood from the description of the embodiments below, which are described while referencing the accompanying drawings.

BRIEF DESCRIPTION OF THE DRAWINGS

FIG. 1 is a block diagram showing a software updating system including a software updating apparatus according to an embodiment;

FIG. 3 is a flow chart showing an example of an operation of the software updating apparatus according to the embodiment;

DESCRIPTION OF THE PREFERRED EMBODIMENTS

Figure 2A:
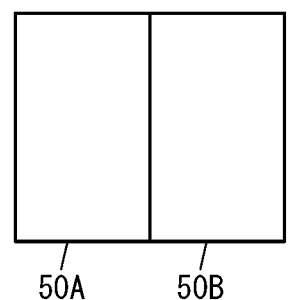
FIGS. 2A and 2B schematically show an example of a configuration of a nonvolatile memory.

The following describes in detail preferred embodiments of a software updating apparatus, a vehicle, and a software updating method according to the present invention, while referencing the accompanying drawings.

Embodiment

The following describes a software updating apparatus, a vehicle, and a software updating method according to one embodiment. FIG. 1 is a block diagram showing a software updating system that includes the software updating apparatus according to the present embodiment.

The software updating system 11 according to the present embodiment includes a vehicle 10 and a server (external device) 22.

The vehicle 10 includes a software updating apparatus 12, a communicating section 14, electronic control units (ECUs) 16, an ignition switch (IGSW) 18, a battery (BAT) 20, and a display section 21. The reference numeral 16 is used when describing an electronic control unit in general, and the reference numerals 16A and 16B are used when describing individual electronic control units. The vehicle 10 includes a large number of electronic control units 16, but FIG. 1 shows two electronic control units 16 among the large number of electronic control units 16. In other words, FIG. 1 shows a first electronic control unit 16A and a second electronic control unit 16B. Here, an example is described of a case in which the first electronic control unit 16A and the second electronic control unit 16B operate cooperatively (operate in synchronization). The vehicle 10 also includes configurational elements other than the configurational elements mentioned above, but descriptions thereof are omitted here.

The server 22 includes a database 38 and a communicating section 40. The communicating section 40 can perform wireless communication with the communicating section 14 included in the vehicle 10. New-version software (update software) for updating the software (old-version software or current software) installed in the electronic control units 16 can be stored in the database 38. The server 22 also includes configurational elements other than the configurational elements mentioned above, but descriptions thereof are omitted here.

The communicating section 14 can perform wireless communication with the communicating section 40 included in the server 22, via a network 25. The network 25 is the Internet, for example, but is not limited to this. The communicating section 14 may be a communicating section that can perform cellular communication, or may be a communicating section that can perform wireless LAN communication. The communicating section 14 can receive the new-version software supplied from the server 22 via the network 25.

The software updating apparatus 12 includes a computing section 24 and a storage section 26. The computing section 24 performs overall control of the software updating apparatus 12. The computing section 24 is formed by a CPU (Central Processing Unit), for example. The computing section 24 performs update control of the software (firmware) by controlling each section based on a program stored in the storage section 26. The storage section 26 includes a volatile memory (not shown in the drawings) and a nonvolatile memory (not shown in the drawings). The new-version software downloaded from the server 22 can be temporarily stored in the storage section 26.

The computing section 24 includes an acquiring section 28, an update control section 30, a time margin determining section 32, a power consumption amount determining section 33, a power amount determining section 34, an update possibility determining section 35, and a scheduled startup timing determining section 36. The acquiring section 28, the update control section 30, the time margin determining section 32, the power consumption amount determining section 33, the power amount determining section 34, the update possibility determining section 35, and the scheduled startup timing determining section 36 can be realized by the computing section 24 executing the program stored in the storage section 26.

The acquiring section 28 acquires the new-version software (software) supplied from the server 22 via the network 25. More specifically, the acquiring section 28 acquires the new-version software received by the communicating section 14.

The update control section 30 performs an update of the software, i.e. the software update, for each of the plurality of electronic control units 16 mounted in the vehicle 10, by using the new-version software acquired by the acquiring section 28.

Here, an example is described of a case in which first old-version software (first current software) is installed in the first electronic control unit (electronic control unit) 16A. Furthermore, the example described here is a case in which second old-version software (second current software) is installed in the second electronic control unit (electronic control unit) 16B. The example described here is a case in which the first old-version software installed in the first electronic control unit 16A is updated by first new-version software supplied from the server 22. Furthermore, the example described here is a case in which the second old-version software installed in the second electronic control unit 16B is updated by second new-version software supplied from the server 22.

The storage capacity of the nonvolatile memory (not shown in the drawings) included in the first electronic control unit 16A is relatively high. FIG. 2A schematically shows an example of a configuration of the nonvolatile memory included in the first electronic control unit 16A. The first electronic control unit 16A includes a plurality of nonvolatile memory chips. Here, an example is described of a case in which two nonvolatile memory chips are included, that is, a first memory chip and a second memory chip are included. The first memory chip is mounted on one surface of a substrate (not shown in the drawings), for example. The second memory chip is mounted on the other surface of the substrate, for example. The first memory chip forms a first bank (first memory bank or first storage location) 50A. The second memory chip forms a second bank (second memory bank or second storage location) 50B. Such a configuration is referred to as a double bank. In the first electronic control unit 16A, in a state where the first old-version software is installed in the first bank 50A, for example, it is possible to install the first new-version software in the second bank 50B. That is, the second bank 50B can function as a buffer when installing the first new-version software. In other words, the second bank 50B can function as a storage-capable region (installation-capable region) in which the first new-version software can be installed in the background. Here, an example is described of a case in which the first electronic control unit 16A includes a plurality of memory chips, but the present invention is not limited to this. The first electronic control unit 16A may instead include a single high-capacity memory chip. The first bank 50A and the second bank 50B may be included in the single high-capacity memory chip.

The first electronic control unit 16A is an electronic control unit having a display control function, for example, but is not limited to this. More specifically, the first electronic control unit 16A is an ECU for in-vehicle infotainment (IVI), an ECU for a meter display section, or the like, for example, but is not limited to this.

Figure 2B:
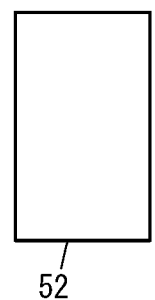

The capacity of the nonvolatile memory (not shown in the drawings) included in the second electronic control unit 16B is relatively low. FIG. 2B schematically shows an example of a configuration of the nonvolatile memory included in the second electronic control unit 16B. The second electronic control unit 16B includes only one nonvolatile memory chip, for example. A bank 52 is formed by the one memory chip. The second electronic control unit 16B includes only one bank 52. Such a configuration is referred to as a single bank. In the second electronic control unit 16B, in a state where the second old-version software is installed in the memory chip, it is not possible to install the second new-version software in this memory chip. In this way, the second electronic control unit 16B does not include a storage-capable region in which the second new-version software can be installed in the background.

As described above, the first electronic control unit 16A includes the second bank 50B, which is a storage-capable region in which the first new-version software can be installed in the background. Therefore, the first new-version software can be installed in the first electronic control unit 16A while the vehicle 10 is travelling.

As described above, the second electronic control unit 16B does not include a storage-capable region in which the second new-version software can be installed in the background. Therefore, the second new-version software cannot be installed in the second electronic control unit 16B while the vehicle 10 is travelling. Accordingly, the update control section 30 performs the installation of the second new-version software in the second electronic control unit 16B when the vehicle 10 is stopped. In other words, the update control section 30 installs the second new-version software in the second electronic control unit 16B when the main power source of the vehicle 10 is OFF, i.e. when the ignition switch 18 is OFF. Even when the ignition switch 18 is OFF, the power can be suitably supplied to the software updating apparatus 12, the communicating section 14, the electronic control units 16, and the like from the battery 20 and the like.

As described above, the first new-version software can be installed in the first electronic control unit 16A even when the vehicle 10 is travelling. From the viewpoint of shortening the time during which the user cannot use the vehicle 10, the first electronic control unit 16A in which the first new-version software can be installed while the vehicle 10 is travelling is preferably configured as described below. Specifically, the first new-version software is preferably installed in the first electronic control unit 16A in advance while the vehicle 10 is travelling. The update control section 30 installs the first new-version software in the first electronic control unit 16A while the vehicle 10 is travelling, for example. As an example, the first new-version software can be installed in the second bank 50B when the first old-version software is installed in the first bank 50A. In this way, the update control section 30 performs the software update for the first electronic control unit 16A such that both the first old-version software and the first new-version software are present in the first electronic control unit 16A.

The activation of the first new-version software installed in the first electronic control unit 16A is not performed while the vehicle 10 is travelling. The installation of the first new-version software in the first electronic control unit 16A may be performed when the vehicle 10 is stopped. The activation means making it possible to perform a function provided to the electronic control unit or the like during a first startup or after an initialization of this electronic control unit or the like.

The update control section 30 performs the activation of the first new-version software installed in the first electronic control unit 16A, when the vehicle 10 is stopped. In other words, the update control section 30 performs the activation of the first new-version software installed in the first electronic control unit 16A, when the main power source of the vehicle 10 is OFF, i.e. when the ignition switch 18 is OFF.

The update control section 30 can perform the software update for the first electronic control unit 16A such that the first electronic control unit 16A in which the first new-version software is installed can operate as described below. Specifically, the update control section 30 performs the software update such that the first electronic control unit 16A can selectively execute operational logic (source code, program code, or program code logic) of the first new-version software and operational logic of the first old-version software.

As described above, the first old-version software is installed in the first bank 50A. In such a state, the first new-version software is installed in the second bank 50B. The first new-version software is installed in the second bank 50B in the state where the first old-version software is installed in the first bank 50A, and therefore the first electronic control unit 16A can operate as described below.

Specifically, the first electronic control unit 16A can selectively execute the operational logic of the first old-version software, which is the software before the update, and the operational logic of the first new-version software, which is the software after the update. The first new-version software may be capable of realizing not only the operational logic of the first new-version software, but also the operational logic of the first old-version software.

When the software update for the second electronic control unit 16B has been completed correctly, the update control section 30 causes the first electronic control unit 16A to start executing the operational logic of the first new-version software. By causing the first electronic control unit 16A to start executing the operational logic of the first new-version software, it is possible to perform a function that could not have been performed by the operational logic of the first old-version software.

The update control section 30 performs a rollback process if the installation of the new-version software in the second electronic control unit 16B has not been completed correctly. Specifically, if the installation of the new-version software in the second electronic control unit 16B has not been completed correctly, the update control section 30 performs a process to return the software of the second electronic control unit 16B to the state prior to the update. In such a case, the update control section 30 causes the first electronic control unit 16A to execute the operational logic of the first old-version software. In such a case, the update control section 30 does not need to activate the first new-version software installed in the first electronic control unit 16A.

If the activation of the new-version software installed in the second electronic control unit 16B has not been completed correctly, the update control section 30 performs the rollback process for the second electronic control unit 16B.

Specifically, if the activation of the new-version software installed in the second electronic control unit 16B has not been completed correctly, the update control section 30 performs a process to return the software of the second electronic control unit 16B to the state prior to the update. In such a case, the update control section 30 causes the first electronic control unit 16A to execute the operational logic of the first old-version software. In such a case, the update control section 30 does not need to activate the first new-version software installed in the first electronic control unit 16A.

In this way, in the present embodiment, the software update is performed such that it is possible for the first electronic control unit 16A to selectively execute the operational logic of the first new-version software and the operational logic of the first old-version software.

According to the present embodiment, in a case where the first electronic control unit 16A in which the new-version software has been installed and the second electronic control unit 16B in which the second new-version software has been installed cannot operate cooperatively, the following can be performed. Specifically, in such a case, the update control section 30 returns the software of the second electronic control unit 16B to the state prior to the update, and causes the first electronic control unit 16A to execute the operational logic of the first old-version software. By doing this, according to the present embodiment, it is possible to cause the first electronic control unit 16A and the second electronic control unit 16B to operate cooperatively, despite the first new-version software being installed in the first electronic control unit 16A.

The time margin determining section 32 can determine whether there is enough time to perform a retry process for the installation of the new-version software. The time margin determining section 32 can determine whether there is enough time to perform the retry process based on the current timing, the time needed for the retry process, and a scheduled timing at which the vehicle 10 is to be started up. The scheduled timing at which the vehicle 10 is to be started up, i.e. the scheduled startup timing of the vehicle 10, can be determined by the scheduled startup timing determining section 36.

In a case where the installation of the new-version software in the electronic control units 16 has not been completed correctly and the time margin determining section 32 determines that there is enough time, the update control section 30 performs a process such as described below. Specifically, in such a case, the update control section 30 performs the retry process for the installation of the new-version software in the electronic control units 16.

The power consumption amount determining section 33 determines a power consumption amount when the software update is performed for the electronic control units 16, based on the power consumption of the vehicle 10 when the software update is performed and the time needed to perform the software update for the electronic control units. The power consumption amount of the first electronic control unit 16A when the software update is performed is determined based on the power consumption of the first electronic control unit 16A when the software is updated and the time needed to perform the software update for the first electronic control unit 16A. The power consumption amount of the second electronic control unit 16B when the software update is performed is determined based on the power consumption of the second electronic control unit 16B when the software is updated and the time needed to perform the software update for the second electronic control unit 16B.

The power consumption amount of the first electronic control unit 16A when the software is updated is a first power consumption amount. The power consumption amount of the second electronic control unit 16B when the software is updated is a second power consumption amount. The amount of power consumed during the software update for the electronic control units 16A and 16B is the sum of the first power consumption amount, the second power consumption amount, and the power consumption amount of each configurational element other than these electronic control units 16A and 16B. Examples of the configurational elements other than the electronic control units 16A and 16B include the software updating apparatus 12, the communicating section 14, and the like, for example. In this way, the amount of power consumed during the software update for the electronic control units 16A and 16B can be calculated based on the first power consumption amount and the second power consumption amount. Information concerning the power consumption of the electronic control units 16 when the software update is performed can be supplied from an external device, i.e. the server 22, via the network 25. Information concerning power consumption of the vehicle 10 when the software update is performed may be supplied from an external device, i.e. the server 22, via the network 25. Information concerning the time needed to perform the software update for the electronic control units 16 can be supplied from the server 22 via the network 25. Here, an example is described of a case in which the power consumption amount determining section 33 is included in the software updating apparatus 12, but the present invention is not limited to this. The power consumption amount determining section 33 may be included in an electronic control unit 16 included in the vehicle 10, separately from the software updating apparatus 12.

The battery 20 includes a voltage sensor (not shown in the drawings), a temperature sensor (not shown in the drawings), and a current sensor (not shown in the drawings). Signals output respectively from these sensors included in the battery 20 are supplied to the software updating apparatus 12. The power amount determining section (remaining battery amount determining section) 34 determines the state of charge (SOC) of the battery 20, based on the signals supplied from the battery 20. Specifically, the power amount determining section 34 determines the amount of power present in the battery 20, i.e. the remaining battery amount. The power amount determining section 34 can determine the amount of power present in the battery 20 based on not only these signals, but also on a deterioration state of the battery 20.

Here, an example is described of a case in which the power amount determining section 34 is included in the software updating apparatus 12, but the present invention is not limited to this. The power amount determining section 34 may be included in an electronic control unit 16 included in the vehicle 10, separately from the software updating apparatus 12.

The update possibility determining section 35 determines whether it is possible to update the software of the electronic control units 16 based on the power consumption amount determined by the power consumption amount determining section 33 and the amount of power present in the battery 20 included in the vehicle 10. If a value obtained by subtracting the power consumption amount determined by the power consumption amount determining section 33 from the amount of power present in the battery 20 is greater than or equal to a threshold value, the update possibility determining section 35 determines that the software update for the electronic control units 16 is possible. The threshold value can be set based on the amount of power needed to restart the vehicle 10, for example, but is not limited to this. If the battery 20 is not a certified product, the update possibility determining section 35 does not determine whether it is possible to update the software of the electronic control units 16 based on the amount of power determined by the power amount determining section 34. This is because, if the battery 20 is not a certified product, the amount of power present in the battery 20 cannot be accurately determined with certainty. Here, an example is described of a case in which the update possibility determining section 35 is included in the software updating apparatus 12, but the present invention is not limited to this. The update possibility determining section 35 may be included in an electronic control unit 16 included in the vehicle 10, separately from the software updating apparatus 12.

If the activation of the first new-version software installed in the first electronic control unit 16A has been completed correctly, the update control section 30 performs a shutdown process on the first electronic control unit 16A. If the activation of the second new-version software installed in the second electronic control unit 16B has been completed correctly, the update control section 30 performs a shutdown process on the second electronic control unit 16B.

The scheduled startup timing determining section 36 stores information such as shown below in the storage section 26, every time the vehicle 10 stops, i.e. every time the main power source of the vehicle 10 is turned OFF. Specifically, the scheduled startup timing determining section 36 stores, in the storage section 26, a date on which the vehicle 10 is stopped, a day of the week on which the vehicle 10 is stopped, a timing at which the stopping of the vehicle 10 is started, a timing at which the stopped vehicle 10 is started up, a location where the vehicle 10 is stopped, and the like. The scheduled startup timing determining section 36 determines the scheduled startup timing of the stopped vehicle 10, based on these pieces of information. The scheduled startup timing determining section 36 determines the scheduled startup timing of the vehicle 10 that is currently stopped, based on the current position of the vehicle 10, the current timing, and the like, for example. The vehicle 10 includes a GNSS (Global Navigation Satellite System) sensor (not shown in the drawings), for example. The scheduled startup timing determining section 36 can detect the current position of the vehicle 10 based on information supplied from the GNSS sensor.

For example, in a case where the current position of the vehicle 10 is within a site at home and the current timing is 21:00, for example, the scheduled startup timing determining section 36 can determine that the vehicle 10 will be started up at 7:00, for example, on the following day. The scheduled startup timing determining section 36 may be realized using artificial intelligence (AI) technology.

If it is predicted that software update for the plurality of electronic control units 16 will be completed by the scheduled startup timing determined by the scheduled startup timing determining section 36, the update control section 30 starts the software update for the plurality of electronic control units 16. More specifically, if it is predicted that the software update for the plurality of electronic control units 16 will be completed by a timing that is a prescribed time before the scheduled startup timing, the update control section 30 starts the software update for the plurality of electronic control units 16. The software update for the electronic control units 16 includes the installation of the new-version software in the electronic control units 16 and the activation of the new-version software installed in the electronic control units 16.

A display screen concerning the software update or the like can be displayed in the display section 21. The display section 21 is a touch panel, for example, but is not limited to this. The user can perform manipulation input to the software updating apparatus 12 by manipulating the touch panel, for example. As an example, the user can indicate the intent to agree to the software update by manipulating the touch panel. The update control section 30 can temporarily suspend the display of the screen in the display section 21 when performing the software update for the electronic control units 16. It is possible to deal with a shortage of power in the battery 20 by suspending the display of the screen in the display section 21.

FIG. 3 is a flow chart showing an example of an operation of the software updating apparatus according to the present embodiment.

At step S1, the power consumption amount determining section 33 makes a determination such as described below, based on the power consumption of the vehicle 10 when the software update is performed and the time needed to update the software of the electronic control units 16. Specifically, the power consumption amount determining section 33 determines the power consumption amount when the software update is performed for the electronic control units 16, based on these pieces of information. As described above, the information concerning the power consumption of the electronic control units 16 when the software update is performed can be supplied from the external device, i.e. the server 22, via the network 25, for example. Furthermore, as described above, the information concerning the power consumption of the vehicle 10 when the software update is performed may be supplied from the external device, i.e. the server 22, via the network 25, for example. As described above, the information concerning the time needed to perform the software update for the electronic control units 16 can be supplied from the server 22 via the network 25, for example. The power consumption amount determining section 33 may determine the power consumption amount when the software update is performed for the electronic control units 16 further based on the power consumption amount needed for the rollback process that can be performed if the software update is not completed correctly. Furthermore, the power consumption amount determining section 33 may determine the power consumption amount when the software update is performed for the electronic control units 16 further based on the power consumption amount needed for the retry process for the installation of the new-version software.

At step S2, the update possibility determining section 35 determines whether it is possible to update the software of the electronic control units 16, based on the power consumption amount determined by the power consumption amount determining section 33 and the amount of power present in the battery 20 included in the vehicle 10. As described above, if the value obtained by subtracting the power consumption amount determined by the power consumption amount determining section 33 from the amount of power present in the battery 20 is greater than or equal to the threshold value, the update possibility determining section 35 makes the determination shown below. Specifically, in such a case, the update possibility determining section 35 determines that it is possible to update the software of the electronic control units 16. If the update possibility determining section 35 determines that it is possible to update the software of the electronic control units 16 (YES at step S2), the process moves to step S3. If the update possibility determining section 35 determines that it is not possible to update the software of the electronic control units 16 (NO at step S2), the process shown in FIG. 3 is completed.

At step S3, the update control section 30 displays, in the display section 21, a display screen for making an inquiry to the user about whether he or she agrees to the software update. Step S3 is performed in a state where the main power source of the vehicle 10 is ON. The user can indicate the intent with regard to agreeing to the software update by manipulating the touch panel included in the display section 21, for example. If the user agrees to the software update (YES at step S3), the process moves to step S4. If the user does not agree to the software update (NO at step S3), the process shown in FIG. 3 is completed.

At step S4, the update control section 30 installs the first new-version software in the first electronic control unit 16A, in the background. After this, the process moves to step S5.

At step S5, the update control section 30 determines whether the main power source of the vehicle 10 is turned OFF. In other words, the update control section 30 determines whether the ignition switch 18 is turned OFF. If the main power source of the vehicle 10 is turned OFF (YES at step S5), the process moves to step S6. If the main power source of the vehicle 10 is ON (NO at step S5), step S5 is repeated.

At step S6, the update control section 30 activates the first new-version software installed in the first electronic control unit 16A. After this, the process moves to step S7.

At step S7, the update control section 30 installs the second new-version software in the second electronic control unit 16B. After this, the process moves to step S8.

At step S8, the update control section 30 activates the second new-version software installed in the second electronic control unit 16B. In this way, the process shown in FIG. 3 is completed.

Figure 4:
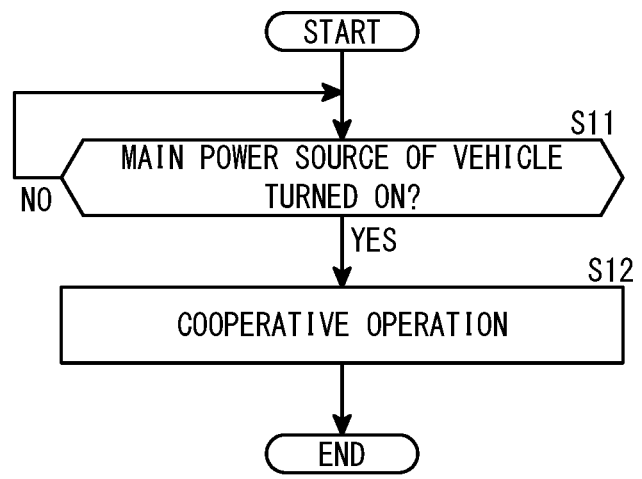
FIG. 4 is a flow chart showing an example of an operation of the software updating apparatus according to the embodiment.

FIG. 4 is a flow chart showing an example of an operation of the software updating apparatus according to the present embodiment. The process shown in FIG. 4 can be performed after the process shown in FIG. 3 is completed.

At step S11, the update control section 30 determines whether the main power source of the vehicle 10 is turned ON. If the main power source of the vehicle 10 is turned ON (YES at step S11), the process moves to step S12. If the main power source of the vehicle 10 is OFF (NO at step S11), step S11 is repeated.

At step S12, the update control section 30 causes the first electronic control unit 16A and the second electronic control unit 16B to start operating cooperatively. The first electronic control unit 16A executes the operational logic of the first new-version software, and the second electronic control unit 16B executes the operational logic of the second new-version software. In this way, the process shown in FIG. 4 is completed.

Figure 5:
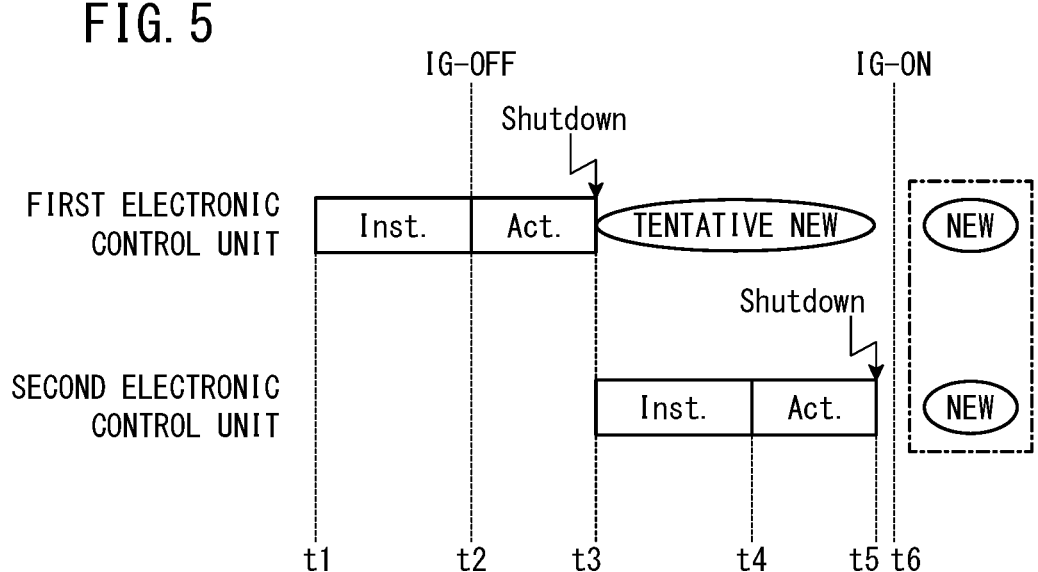
FIG. 5 is a timing chart showing an example of an operation of the software updating apparatus according to the embodiment.

FIG. 5 is a timing chart showing an example of an operation of the software updating apparatus according to the present embodiment. FIG. 5 corresponds to steps S4 to S8 in FIG. 3.

As shown in FIG. 5, at a timing t1, the installation of the first new-version software in the first electronic control unit 16A is started. At the timing t1, the ignition switch 18 is ON and the vehicle 10 is travelling. In this way, the installation of the first new-version software in the first electronic control unit 16A is performed in a state where the ignition switch 18 is ON. In other words, the installation of the first new-version software in the first electronic control unit 16A is performed while the vehicle 10 is travelling. At this time, the installation of the second new-version software in the second electronic control unit 16B is not performed.

At a timing t2, the ignition switch 18 is turned OFF. In other words, the vehicle 10 is stopped at the timing t2. When the ignition switch 18 is turned OFF, the activation of the first new-version software installed in the first electronic control unit 16A is started.

At a timing t3, the activation of the first new-version software installed in the first electronic control unit 16A is completed. Even through the first new-version software is installed in the first electronic control unit 16A, the first electronic control unit 16A can still execute the operational logic of the first old-version software (TENTATIVE NEW). When the activation of the first new-version software installed in the first electronic control unit 16A is completed correctly, the update control section 30 performs the shutdown process on the first electronic control unit 16A. Furthermore, when the activation of the first new-version software installed in the first electronic control unit 16A is completed correctly, the installation of the second new-version software in the second electronic control unit 16B is started.

At a timing t4, the installation of the second new-version software in the second electronic control unit 16B is completed. When the installation of the second new-version software in the second electronic control unit 16B is completed, the activation of the second new-version software installed in the second electronic control unit 16B is started.

At a timing t5, the activation of the second new-version software installed in the second electronic control unit 16B is completed. When the activation of the second new-version software installed in the second electronic control unit 16B is completed correctly, the update control section 30 performs the shutdown process on the second electronic control unit 16B.

At a timing t6, the ignition switch 18 is turned ON. From the timing t6 onward, the first electronic control unit 16A executes the operational logic of the first new-version software (NEW). Furthermore, from the timing t6 onward, the second electronic control unit 16B operates based on the second new-version software (NEW). From the timing t6 onward, the first electronic control unit 16A executes the operational logic of the first new-version software, and therefore the first electronic control unit 16A and the second electronic control unit 16B can be caused to operate cooperatively. By causing the first electronic control unit 16A to start executing the operational logic of the first new-version software, it is possible to perform a function that could not have been performed with the operational logic of the first old-version software. For example, before the timing t6, the operational logic of the first old-version software is executed. Therefore, the screen in which the user selects a prescribed function that can be newly performed according to the first new-version software is not displayed in the display section 21 before the timing t6. From the timing t6 onward, the screen in which the user selects the prescribed function that can be newly performed according to the first new-version software can be displayed in the display section 21.

Figure 6:
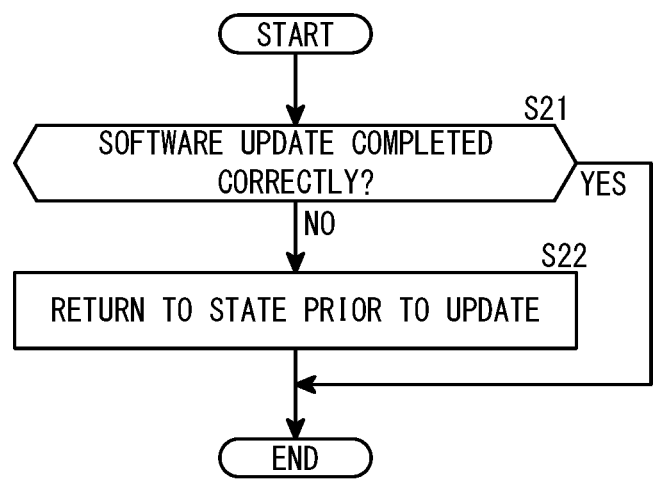
FIG. 6 is a flow chart showing an example of an operation of the software updating apparatus according to the embodiment.

FIG. 6 is a flow chart showing an example of an operation of the software updating apparatus according to the present embodiment. The process shown in FIG. 6 can be performed after the software update is performed.

At step S21, the update control section 30 determines whether the software update has been completed correctly. If the software update has been completed correctly (YES at step S21), the process shown in FIG. 6 is completed. On the other hand, if the software update has not been completed correctly (NO at step S21), the process moves to step S22.

At step S22, the update control section 30 returns the software to the state prior to the update. For example, if the software update using the second new-version software has not been performed correctly in the second electronic control unit 16B, the update control section 30 returns the software of the second electronic control unit 16B to the state prior to the update. In this way, the process shown in FIG. 6 is completed.

Figure 7:
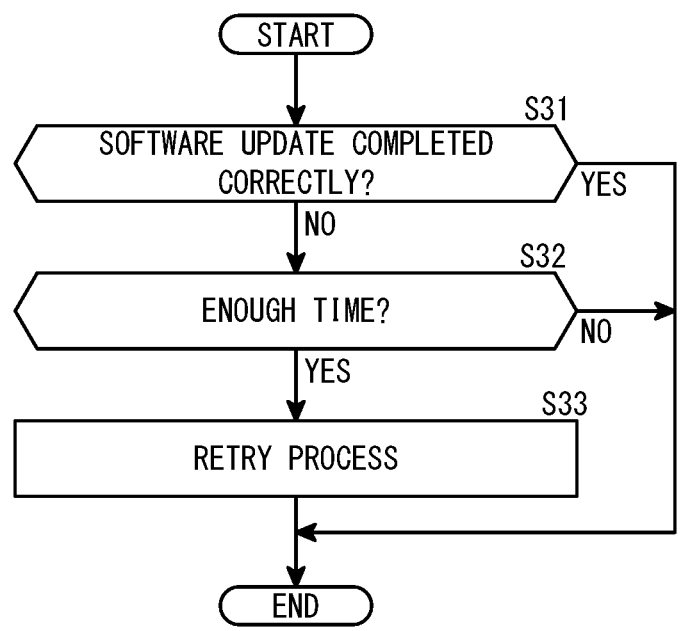
FIG. 7 is a flow chart showing an example of an operation of the software updating apparatus according to the embodiment.

FIG. 7 is a flow chart showing an example of an operation of the software updating apparatus according to the present embodiment. The process shown in FIG. 7 can be performed after the software update is performed.

At step S31, the update control section 30 determines whether the software update has been completed correctly. If the software update has been completed correctly (YES at step S31), the process shown in FIG. 7 is completed. On the other hand, if the software update has not been completed correctly (NO at step S31), the process moves to step S32.

At step S32, the time margin determining section 32 determines whether there is enough time to perform the retry process for the installation of the new-version software. If there is enough time to perform the retry process for the installation of the new-version software (YES at step S32), the process moves to step S33. If there is not enough time to perform the retry process for the installation of the new-version software (NO at step S32), the process shown in FIG. 7 is completed.

At step S33, the update control section 30 performs the retry process for the installation of the new-version software. In this way, the process shown in FIG. 7 is completed.

Figure 8:
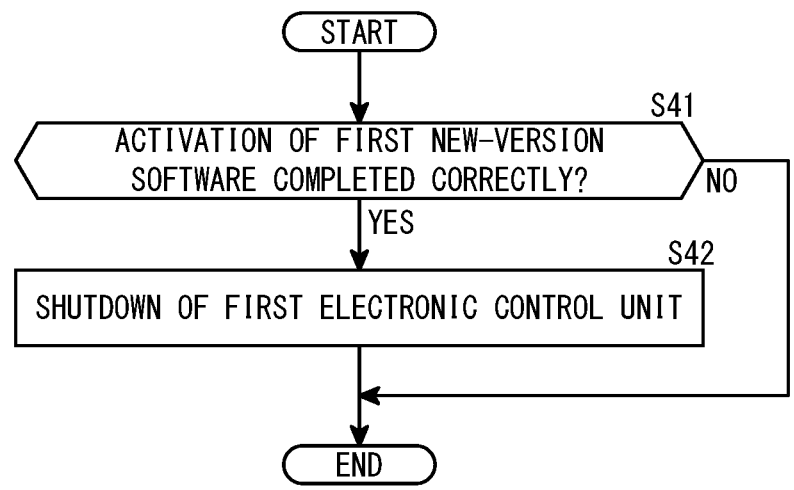
FIG. 8 is a flow chart showing an example of an operation of the software updating apparatus according to the embodiment.

FIG. 8 is a flow chart showing an example of an operation of the software updating apparatus according to the present embodiment. The process shown in FIG. 8 can be performed after the activation of the first new-version software for the first electronic control unit 16A is completed.

At step S41, a determination is made as to whether the activation of the first new-version software for the first electronic control unit 16A has been completed correctly. If the activation of the first new-version software for the first electronic control unit 16A has been completed correctly (YES at step S41), the process moves to step S42. If the activation of the first new-version software for the first electronic control unit 16A has not been completed correctly (NO at step S41), the process shown in FIG. 8 is completed.

At step S42, the update control section 30 performs the shutdown process on the first electronic control unit 16A. In this way, the process shown in FIG. 8 is completed.

Figure 9:
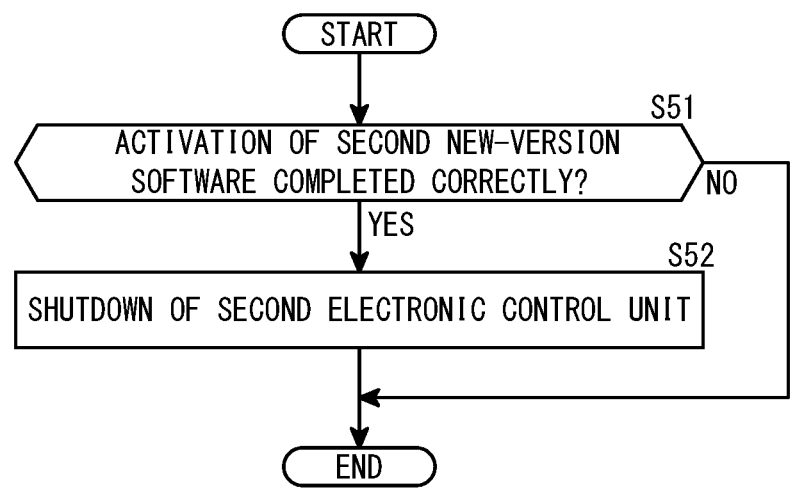
FIG. 9 is a flow chart showing an example of an operation of the software updating apparatus according to the embodiment.

FIG. 9 is a flow chart showing an example of an operation of the software updating apparatus according to the present embodiment. The process shown in FIG. 9 can be performed after the activation for the second electronic control unit 16B is completed.

At step S51, a determination is made as to whether the activation of the second new-version software for the second electronic control unit 16B has been completed correctly. If the activation of the second new-version software for the second electronic control unit 16B has been completed correctly (YES at step S51), the process moves to step S52. If the activation of the second new-version software for the second electronic control unit 16B has not been completed correctly (NO at step S51), the process shown in FIG. 9 is completed.

At step S52, the update control section 30 performs the shutdown process on the second electronic control unit 16B. In this way, the process shown in FIG. 9 is completed.

Figure 10:
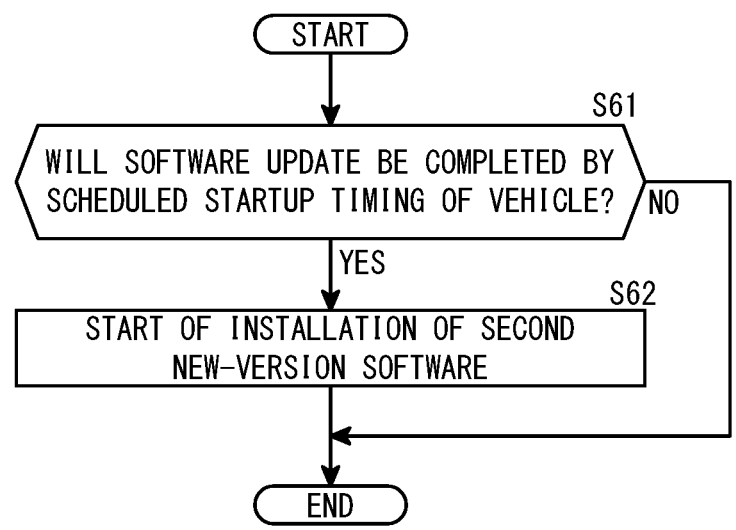
FIG. 10 is a flow chart showing an example of an operation of the software updating apparatus according to the embodiment.

FIG. 10 is a flow chart showing an example of an operation of the software updating apparatus according to the present embodiment. The process shown in FIG. 10 can be performed before the installation of the software in the electronic control units 16 is started, for example.

At step S61, the update control section 30 determines whether the software update will be completed by the scheduled startup timing of the vehicle 10. If it is predicted that the software update will be completed by the scheduled startup timing of the vehicle 10 (YES at step S61), the process moves to step S62. If it is predicted that the software update will not be completed by the scheduled startup timing of the vehicle 10 (NO at step S61), the process shown in FIG. 10 is completed.

At step S62, the update control section 30 starts installing the second new-version software in the electronic control units 16. In this way, the process shown in FIG. 10 is completed.

In this way, according to the present embodiment, the power consumption amount when the software update is performed is determined based on the power consumption of the vehicle 10 when the software update is performed and the time needed to perform the software update for the electronic control units 16. The determination as to whether the software update is possible is then made based on the power consumption amount when the software update is performed and the amount of power present in the battery 20 included in the vehicle 10.

Therefore, according to the present embodiment, it is possible to determine, with high accuracy, whether it is possible to update the software. Due to this, according to the present embodiment, it is possible to increase the performance efficiency of the software update.

While the preferred embodiments of the present invention have been described above, the technical scope of the invention is not limited to the above described embodiments, and various alterations and improvements can be made without deviating from the scope of the present invention.

The following is a summary of the embodiments described above.

A software updating apparatus (12) comprises an acquiring section (28) that acquires new-version software supplied via a network (25); an update control section (30) that performs a software update for an electronic control unit (16A, 16B) mounted in a vehicle (10), using the new-version software acquired by the acquiring section; a power consumption amount determining section (33) that determines a power consumption amount when the software update is performed for the electronic control unit, based on a power consumption of the vehicle when the software update is performed and time needed to perform the software update for the electronic control unit; and an update possibility determining section (35) that determines whether the software update for the electronic control unit is possible, based on the power consumption amount determined by the power consumption amount determining section and an amount of power present in a battery (20) included in the vehicle, wherein if the update possibility determining section determines that the software update for the electronic control unit is possible, the update control section performs the software update for the electronic control unit. According to such a configuration, the power consumption amount when the software update is performed is determined based on the power consumption of the vehicle when the software update is performed and the time needed to perform the software update for the electronic control unit. Then, whether the software update is possible is determined based on the power consumption amount when the software update is performed and the amount of power present in the battery. According to such a configuration, it is possible to determine, with high accuracy, the difference between the power consumption amount when the software update is performed and the amount of power present in the battery, and therefore there is no need to consider a sufficient margin when determining whether the software update is possible. Therefore, according to such a configuration, it is possible to improve the performance efficiency of the software update. The update control section may be included in the vehicle.

At least one of information concerning the power consumption of the vehicle when the software update is performed and information concerning the time needed to perform the software update for the electronic control unit may be supplied from an external device (22) via the network.

A first electronic control unit (16A) among a plurality of the electronic control units may include a storage-capable region (50B) in which first new-version software, for updating first old-version software installed in the first electronic control unit, can be installed in the background, and the update control section may perform installation of the first new-version software in the storage-capable region of the first electronic control unit before installation of second new-version software in a second electronic control unit (16B) that operates cooperatively with the first electronic control unit and, if the software update for the second electronic control unit has been completed correctly, the update control section may cause the first electronic control unit to start executing operational logic of the first new-version software. According to such a configuration, execution of the operational logic of the first new-version software is started after the software update for the second electronic control unit has been completed correctly. Therefore, according to such a configuration, it is possible to prevent problems from occurring in the operation of the vehicle due to a failure of the software update.

The software updating apparatus may further comprise a time margin determining section (32) that determines whether there is enough time, and if installation of the new-version software in the electronic control unit has not been completed correctly and the time margin determining section determines that there is enough time, the update control section may perform a retry process for the installation of the new-version software in the electronic control unit. According to such a configuration, even if the installation of the second new-version software in the second electronic control unit was unable to be performed correctly, it is possible to install the second new-version software in the second electronic control unit by using the retry process.

If installation of the new-version software in the electronic control unit or activation of the new-version software installed in the electronic control unit has not been completed correctly, the update control section may perform a rollback process on the electronic control unit. According to such a configuration, if the installation or activation of the second new-version software for the second electronic control unit cannot be performed correctly, it is possible to return the software of the second electronic control unit to the state prior to the update.

The update control section may temporarily suspend display of a screen in a display section (21) included in the vehicle, when performing the software update for the electronic control unit. According to such a configuration, even when there is not necessarily enough power present in the battery, it is possible to perform the software update.

If the software update for the electronic control unit has been completed correctly, the update control section may perform a shutdown process on the electronic control unit. According to such a configuration, it is possible to prevent needless power consumption.

A first electronic control unit among a plurality of the electronic control units may include a storage-capable region in which first new-version software, for updating first old-version software installed in the first electronic control unit, can be installed in a background, and the update control section may perform installation of the first new-version software in the first electronic control unit while the vehicle is travelling. According to such a configuration, even when there is not necessarily enough power present in the battery, it is possible to perform the software update.

A first electronic control unit among a plurality of the electronic control units may include a storage-capable region in which first new-version software, for updating first old-version software installed in the first electronic control unit, can be installed in a background, and the update control section may perform the software update for the first electronic control unit such that, after the software update has been performed, the first electronic control unit can selectively execute operational logic of the first new-version software and operational logic of the first old-version software. According to such a configuration, the software update is performed such that the first electronic control unit can selectively execute the operational logic of the first new-version software and the operational logic of the first old-version software. According to such a configuration, if the first electronic control unit in which the first new-version software has been installed and the second electronic control unit in which the second new-version software has been installed cannot operate cooperatively in a favorable manner, it is possible to perform the following.

Specifically, in such a case, the update control section returns the software of the second electronic control unit to the state prior to the update and causes the first electronic control unit to execute the operational logic of the first old-version software. By doing this, according to such a configuration, it is possible to cause the first electronic control unit and the second electronic control unit, in which the software has been returned to the state prior to the update, to operate cooperatively despite the first new-version software being installed in the first electronic control unit.

A first electronic control unit among a plurality of the electronic control units may include a storage-capable region in which first new-version software, for updating first old-version software installed in the first electronic control unit, can be installed in a background, and when the first electronic control unit is caused to start executing operational logic of the first new-version software, it is possible to perform a function that could not be performed with operational logic of the first old-version software.

The software updating apparatus may further comprise a scheduled startup timing determining section (36) that determines a scheduled startup timing, which is a timing at which the vehicle is scheduled to be started up, and if the software update for the electronic control unit is predicted to be completed by the scheduled startup timing determined by the scheduled startup timing determining section, the update control section may start the software update for the electronic control unit. According to such a configuration, if the software update cannot be completed by the scheduled startup timing of the vehicle, the software update for the second electronic control unit is not started. Therefore, it is possible to prevent the occurrence of a situation where the user cannot use the vehicle.

The first electronic control unit may be an electronic control unit that has a display control function. The electronic control unit that has a display control function includes a high-capacity memory chip.

The first electronic control unit may be an electronic control unit for in-vehicle infotainment. The electronic control unit for in-vehicle infotainment includes a high-capacity memory chip.

The software updating apparatus may further comprise a power amount determining section (34) that determines the amount of power present in the battery.

The power amount determining section may determine the amount of power present in the battery based on a deterioration state of the battery. According to such a configuration, it is possible to more favorably determine whether the software update is possible.

If the battery is not a certified product, the update possibility determining section does not need to determine whether the software update for the electronic control unit is possible based on the amount of power determined by the power amount determining section. According to such a configuration, it is possible to prevent the update possibility determining section from determining that the software update can be performed even though the software update cannot actually be performed.

A software updating apparatus comprises an acquiring section that acquires new-version software supplied via a network; an update control section that performs a software update for an electronic control unit mounted in a vehicle, using the new-version software acquired by the acquiring section; a power consumption amount determining section that determines a power consumption amount when the software update is performed for the electronic control unit, based on a power consumption of the vehicle when the software update is performed and time needed to perform the software update for the electronic control unit; and an update possibility determining section that determines whether the software update for the electronic control unit is possible, based on the power consumption amount determined by the power consumption amount determining section and an amount of power present in a battery included in the vehicle, wherein, if a value obtained by subtracting the power consumption amount determined by the power consumption amount determining section from the amount of power present in the battery is greater than or equal to a threshold value, the update possibility determining section determines that the software update for the electronic control unit is possible, and if the update possibility determining section determines that the software update for the electronic control unit is possible, the update control section performs the software update for the electronic control unit. According to such a configuration, it is possible to determine, with high accuracy, the difference between the power consumption amount when the software update is performed and the amount of power present in the battery, and therefore there is no need to consider a sufficient margin when determining whether the software update is possible. Therefore, according to such a configuration, it is possible to improve the performance efficiency of the software update.

A vehicle (10) comprises the software updating apparatus such as described above.

A software updating method for performing a software update for an electronic control unit included in a vehicle, by using new-version software supplied via a network, comprises a step (S1) of determining a power consumption amount when the software update is performed for the electronic control unit, based on a power consumption of the vehicle when the software update is performed and time needed to perform the software update for the electronic control unit; and a step (S2) of determining whether the software update for the electronic control unit is possible, based on the power consumption amount determined in the step of determining the power consumption amount and an amount of power present in a battery included in the vehicle.

What is claimed is:

1. A software updating apparatus comprising one or more processors that execute computer-executable instructions stored in a memory, wherein the one or more processors execute the computer-executable instructions to cause the software updating apparatus to:
    acquire new-version software supplied via a network;
    perform a software update for an electronic control unit mounted in a vehicle, using the new-version software acquired by the acquiring section;
    determine a power consumption amount when the software update is performed for the electronic control unit;
    determine whether the software update for the electronic control unit is possible, based on the power consumption amount determined and an amount of power present in a battery included in the vehicle; and
    if the software update for the electronic control unit is determined to be possible, perform the software update for the electronic control unit, wherein
    a first electronic control unit among a plurality of the electronic control units includes a storage-capable region in which first new-version software, for updating first old-version software installed in the first electronic control unit, is allowed to be installed in a background, and
    the one or more processors cause the software updating apparatus to:
        perform installation of the first new-version software in the storage-capable region of the first electronic control unit before installation of second new-version software in a second electronic control unit configured to operate cooperatively with the first electronic control unit; and
        if the software update for the second electronic control unit has been completed correctly, cause the first electronic control unit to start executing operational logic of the first new-version software.

2. The software updating apparatus according to claim 1, wherein
    the one or more processors are included in the vehicle.

3. The software updating apparatus according to claim 1, wherein the one or more processors cause the software updating apparatus to:
    determine whether there is enough time; and
    if installation of the new-version software in the electronic control unit has not been completed correctly and time is determined to be enough, perform a retry process for the installation of the new-version software in the electronic control unit.

4. The software updating apparatus according to claim 1, wherein
    if installation of the new-version software in the electronic control unit or activation of the new-version software installed in the electronic control unit has not been completed correctly, the one or more processors cause the software updating apparatus to perform a rollback process on the electronic control unit.

5. The software updating apparatus according to claim 1, wherein the one or more processors cause the software updating apparatus to
temporarily suspend display of a screen in a display section included in the vehicle, when performing the software update for the electronic control unit.

6. The software updating apparatus according to claim 1, wherein
if the software update for the electronic control unit has been completed correctly, the one or more processors cause the software updating apparatus to perform a shutdown process on the electronic control unit.

7. The software updating apparatus according to claim 1, wherein
the one or more processors cause the software updating apparatus to perform installation of the first new-version software in the first electronic control unit while the vehicle is travelling.

8. The software updating apparatus according to claim 1, wherein the one or more processors cause the software updating apparatus to:
determine a scheduled startup timing, which is a timing at which the vehicle is scheduled to be started up; and
if the software update for the electronic control unit is predicted to be completed by the scheduled startup timing start the software update for the electronic control unit.

9. The software updating apparatus according to claim 1, wherein
the first electronic control unit is an electronic control unit that has a display control function.

10. The software updating apparatus according to claim 9, wherein
the first electronic control unit is an electronic control unit for in-vehicle infotainment.

11. The software updating apparatus according to claim 1, wherein the one or more processors cause the software updating apparatus to determine the amount of power present in the battery.

12. The software updating apparatus according to claim 11, wherein
the one or more processors cause the software updating apparatus to determine the amount of power present in the battery based on a deterioration state of the battery.

13. The software updating apparatus according to claim 11, wherein
if the battery is not a certified product, the one or more processors cause the software updating apparatus not to determine whether the software update for the electronic control unit is possible based on the amount of power determined.

14. The software updating apparatus according to claim 1,
if a value obtained by subtracting the power consumption amount determined by the power consumption amount determining section from the amount of power present in the battery is greater than or equal to a threshold value, the update processors cause the software updating apparatus to determine that the software update for the electronic control unit is possible.

15. The software updating apparatus according to claim 1, wherein the one or more processors cause the software updating apparatus to determine the power consumption amount when the software update is performed for the electronic control unit, based on a power consumption of the vehicle when the software update is performed and time needed to perform the software update for the electronic control unit.

16. The software updating apparatus according to claim 15, wherein
at least one of information concerning the power consumption of the vehicle when the software update is performed and information concerning the time needed to perform the software update for the electronic control unit is supplied from an external device via the network.

17. A vehicle comprising the software updating apparatus according to claim 1.

18. A software updating apparatus comprising one or more processors that execute computer-executable instructions stored in a memory, wherein the one or more processors execute the computer-executable instructions to cause the software updating apparatus to:
acquire new-version software supplied via a network;
perform a software update for an electronic control unit mounted in a vehicle, using the new-version software acquired by the acquiring section;
determine a power consumption amount when the software update is performed for the electronic control unit;
determine whether the software update for the electronic control unit is possible, based on the power consumption amount determined and an amount of power present in a battery included in the vehicle; and
perform the software update for the electronic control unit if the software update for the electronic control unit is determined possible, wherein
a first electronic control unit among a plurality of the electronic control units includes a storage-capable region in which first new-version software, for updating first old-version software installed in the first electronic control unit, is allowed to be installed in a background, and
the one or more processors cause the software updating apparatus to perform the software update for the first electronic control unit such that, after the software update has been performed, the first electronic control unit is allowed to selectively execute operational logic of the first new-version software and operational logic of the first old-version software.

19. A software updating apparatus comprising one or more processors that execute computer-executable instructions stored in a memory, wherein the one or more processors execute the computer-executable instructions to cause the software updating apparatus to:
acquire new-version software supplied via a network;
perform a software update for an electronic control unit mounted in a vehicle, using the new-version software acquired by the acquiring section;
determine a power consumption amount when the software update is performed for the electronic control unit;
determine whether the software update for the electronic control unit is possible, based on the power consumption amount determined and an amount of power present in a battery included in the vehicle; and
perform the software update for the electronic control unit if the software update for the electronic control unit is determined possible,
a first electronic control unit among a plurality of the electronic control units includes a storage-capable region in which first new-version software, for updating first old-version software installed in the first electronic control unit, is allowed to be installed in a background, and when the first electronic control unit is caused to start executing operational logic of the first new-version software, a function that was not allowed to be performed with operational logic of the first old-version software is allowed to be performed.

20. A software updating method for performing a software update for an electronic control unit included in a vehicle, by using new-version software supplied via a network, the software updating method comprising:

a step of determining a power consumption amount when the software update is performed for the electronic control unit; and a step of determining whether the software update for the electronic control unit is possible, based on the power consumption amount determined in the step of determining the power consumption amount and an amount of power present in a battery included in the vehicle, wherein a first electronic control unit among a plurality of the electronic control units includes a storage-capable region in which first new-version software, for updating first old-version software installed in the first electronic control unit, is allowed to be installed in a background, and the one or more processors cause the software updating apparatus to perform installation of the first new-version software in the storage-capable region of the first electronic control unit before installation of second new-version software in a second electronic control unit configured to operate cooperatively with the first electronic control unit and, if the software update for the second electronic control unit has been completed correctly, cause the first electronic control unit to start executing operational logic of the first new-version software.

21. A software updating method for performing a software update for an electronic control unit included in a vehicle, by using new-version software supplied via a network, the software updating method comprising:

a step of determining a power consumption amount when the software update is performed for the electronic control unit; and a step of determining whether the software update for the electronic control unit is possible, based on the power consumption amount determined in the step of determining the power consumption amount and an amount of power present in a battery included in the vehicle, wherein a first electronic control unit among a plurality of the electronic control units includes a storage-capable region in which first new-version software, for updating first old-version software installed in the first electronic control unit, is allowed to be installed in a background, and in performing the software update, the software update for the first electronic control unit is performed such that, after the software update has been performed, the first electronic control unit is allowed to selectively execute operational logic of the first new-version software and operational logic of the first old-version software.

22. A software updating method for performing a software update for an electronic control unit included in a vehicle, by using new-version software supplied via a network, the software updating method comprising:

a step of determining a power consumption amount when the software update is performed for the electronic control unit; and a step of determining whether the software update for the electronic control unit is possible, based on the power consumption amount determined in the step of determining the power consumption amount and an amount of power present in a battery included in the vehicle, wherein a first electronic control unit among a plurality of the electronic control units includes a storage-capable region in which first new-version software, for updating first old-version software installed in the first electronic control unit, is allowed to be installed in a background, and when the first electronic control unit is caused to start executing operational logic of the first new-version software, a function that was not allowed to be performed with operational logic of the first old-version software is allowed to be performed.

* * * * *